United States Patent
Esfahany et al.

(10) Patent No.: US 7,979,857 B2
(45) Date of Patent: *Jul. 12, 2011

(54) METHOD AND APPARATUS FOR DYNAMIC MEMORY RESOURCE MANAGEMENT

(75) Inventors: Kouros H. Esfahany, Huntington, NY (US); Michael R. Chiaramonte, Centereach, NY (US); Karthik Narayanan, Coram, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1241 days.

This patent is subject to a terminal disclaimer.

(21) Appl. No.: 11/114,749

(22) Filed: Apr. 25, 2005

(65) Prior Publication Data
US 2005/0262505 A1 Nov. 24, 2005

Related U.S. Application Data (60) Provisional application No. 60/573,578, filed on May 21, 2004.

(51) Int. Cl.
- G06F 9/455 (2006.01)
- G06F 9/46 (2006.01)
- G06F 15/173 (2006.01)
- G06F 13/00 (2006.01)

(52) U.S. Cl. ............ 718/1; 718/103; 718/104; 718/105; 709/226; 711/170; 711/173

(58) Field of Classification Search ....... 718/1, 100–104
See application file for complete search history.

(56) References Cited

U.S. PATENT DOCUMENTS

| | | | |
|---|---|---|---|
| 4,253,145 A | 2/1981 | Goldberg | |
| 5,742,762 A | 4/1998 | Scholl et al. | 395/200.3 |
| 5,870,559 A | 2/1999 | Leshem et al. | 395/200.54 |
| 5,889,523 A | 3/1999 | Wilcox et al. | 345/357 |
| 6,115,646 A | 9/2000 | Fizman et al. | 700/181 |
| 6,122,664 A | 9/2000 | Boukobza et al. | 709/224 |
| 6,145,001 A | 11/2000 | Scholl et al. | 709/223 |
| 6,173,306 B1 | 1/2001 | Raz et al. | 709/102 |
| 6,178,529 B1 | 1/2001 | Short et al. | 714/51 |
| 6,226,273 B1 | 5/2001 | Busuioc et al. | 370/270 |
| 6,304,864 B1 | 10/2001 | Liddy et al. | 706/15 |
| 6,331,858 B2 | 12/2001 | Fisher | 345/582 |
| 6,430,592 B1 * | 8/2002 | Davison | 718/103 |

(Continued)

FOREIGN PATENT DOCUMENTS
WO    WO 01/38992 A2    5/2001

(Continued)

OTHER PUBLICATIONS

Jeannette Lawrence, Introduction to Neural Networks, 1994 California Scientific Software Press, 6th Edition, 18, 28 (4 pgs.), 1994.

Communication—Supplementary European Search Report in Application No. 02752185.5-1243, dated Apr. 27, 2007, received Jun. 19, 2007 (4 pgs.).

(Continued)

Primary Examiner — Jennifer N To
(74) Attorney, Agent, or Firm — Baker Botts L.L.P.

(57) ABSTRACT

A method and an apparatus for dynamic memory resource management are provided. Memory activity information is collected for a virtual machine. Additional memory shares are dynamically allocated to the virtual machine, as needed, based on the memory activity information for the virtual machine and based on a specified priority of the virtual machine in order to properly adjust the total physical memory used by the virtual machine.

18 Claims, 4 Drawing Sheets

U.S. PATENT DOCUMENTS

| | | | |
|---|---|---|---|
| 6,505,217 B1 | 1/2003 | Venkatraman et al. | |
| 6,530,840 B1 | 3/2003 | Cuomo et al. | 463/42 |
| 6,691,176 B1 | 2/2004 | Narin et al. | 709/318 |
| 6,694,419 B1 * | 2/2004 | Schnee et al. | 711/173 |
| 6,738,886 B1 * | 5/2004 | Mendoza et al. | 711/173 |
| 6,742,099 B1 * | 5/2004 | Mendoza et al. | 711/173 |
| 6,745,312 B1 * | 6/2004 | Schnee et al. | 711/173 |
| 6,848,104 B1 | 1/2005 | Van Ee et al. | 719/310 |
| 6,851,030 B2 * | 2/2005 | Tremaine | 711/160 |
| 6,853,738 B1 | 2/2005 | Nishigaki et al. | 382/106 |
| 6,910,210 B1 * | 6/2005 | Chew | 718/103 |
| 6,968,441 B1 * | 11/2005 | Schnee | 711/173 |
| 6,986,137 B1 | 1/2006 | King et al. | |
| 7,080,379 B2 | 7/2006 | Brenner et al. | 718/105 |
| 7,143,413 B2 * | 11/2006 | McCarthy et al. | 718/104 |
| 7,228,546 B1 * | 6/2007 | McCarthy et al. | 718/104 |
| 7,299,468 B2 * | 11/2007 | Casey et al. | 718/104 |
| 7,308,687 B2 | 12/2007 | Trossman et al. | 718/104 |
| 7,673,114 B2 * | 3/2010 | Allen et al. | 711/173 |
| 2001/0028729 A1 | 10/2001 | Nishigaki et al. | 382/104 |
| 2002/0087611 A1 | 7/2002 | Tanaka et al. | 709/1 |
| 2002/0091702 A1 | 7/2002 | Mullins | 707/100 |
| 2002/0173863 A1 | 11/2002 | Imada et al. | 700/83 |
| 2002/0184171 A1 | 12/2002 | McClanahan | 706/20 |
| 2003/0009543 A1 | 1/2003 | Gupta | 709/223 |
| 2003/0037092 A1 * | 2/2003 | McCarthy et al. | 709/104 |
| 2003/0158884 A1 | 8/2003 | Alford, Jr. | 709/104 |
| 2003/0182597 A1 * | 9/2003 | Coha et al. | 714/38 |
| 2003/0214525 A1 | 11/2003 | Esfahany | 345/700 |
| 2003/0233571 A1 | 12/2003 | Kraus et al. | |
| 2004/0143664 A1 * | 7/2004 | Usa et al. | 709/226 |
| 2004/0154018 A1 | 8/2004 | Doering et al. | |
| 2004/0221121 A1 | 11/2004 | Hamilton, II et al. | 711/170 |
| 2004/0250248 A1 | 12/2004 | Halpern et al. | 718/100 |
| 2005/0015661 A1 | 1/2005 | Vaidyanathan | 714/13 |
| 2005/0038989 A1 | 2/2005 | Esfahany | |
| 2005/0044301 A1 | 2/2005 | Vasilevsky et al. | 711/1 |
| 2005/0081201 A1 | 4/2005 | Aguilar, Jr. et al. | 718/100 |
| 2005/0120160 A1 | 6/2005 | Plouffe et al. | 711/1 |
| 2005/0131941 A1 | 6/2005 | Dettinger et al. | 707/104.1 |
| 2005/0132362 A1 | 6/2005 | Knauerhase et al. | 718/1 |
| 2005/0262504 A1 | 11/2005 | Esfahany et al. | 718/1 |
| 2005/0289145 A1 | 12/2005 | Voegel | 707/9 |
| 2006/0017969 A1 | 1/2006 | Ly et al. | 358/1.15 |
| 2006/0020781 A1 | 1/2006 | Scarlata et al. | |
| 2006/0069761 A1 | 3/2006 | Singh et al. | |
| 2006/0136912 A1 | 6/2006 | Robinson et al. | 718/1 |
| 2006/0242641 A1 | 10/2006 | Kinsey et al. | |
| 2006/0265711 A1 | 11/2006 | Bantz et al. | 718/1 |
| 2007/0055647 A1 | 3/2007 | Mullins et al. | 707/2 |
| 2007/0079308 A1 | 4/2007 | Chiaramonte et al. | 718/1 |
| 2007/0094367 A1 | 4/2007 | Esfahany et al. | 709/223 |
| 2007/0106769 A1 | 5/2007 | Liu | 709/223 |
| 2007/0266136 A1 | 11/2007 | Esfahany et al. | 709/223 |

FOREIGN PATENT DOCUMENTS

| | | |
|---|---|---|
| WO | WO 02/088938 A1 | 11/2002 |
| WO | WO 03/071424 | 8/2003 |
| WO | WO 03/088046 | 10/2003 |

OTHER PUBLICATIONS

Omer F. Rana et al., "Resource Discovery for Dynamic Clusters in Computational Grids," XP-002429542, *IEEE*, 2001, 759-767 (9 pgs.), 2001.

PCT, Notification of Transmittal of the International Search Report and the Written Opinion of the International Searching Authority, or the Declaration, PCT/US2006/040918 (10 Pgs.), Date Mailed Jan. 31, 2007.

Platform Computing, Inc., "*An Introduction to Platform VM Orchestrator. Extract More Value from a Virtual Server Environment Through Automated Management*", XP002415478, (13 pgs.), Oct. 1, 2005.

Gamma, et al., "*Design Patterns Elements of Resusable Object-Oriented Software*", XP002261440, (24 pgs.), 1997.

VMware, Inc., "*VMware VirtualCenter User's Manual Version 1.0*", XP002407050, retrieved from the internet http://www.vmware.com/pdf/VirtualCenter_Users_Manual.pdf, retrieved on Aug. 16, 2005, (143 pgs.).

Notification of Transmittal of the International Search Report and the Written Opinion of the International Searching Authority, or the Declaration; International Application No. PCT/US2005/014270 dated Aug. 8, 2005 (11 pgs).

PCT, Notification of Transmittal of the International Search Report and the Written Opinion of the International Searching Authority, or the Declaration; International Application No. PCT/US2006/038055; date mailed Feb. 1, 2007 (12 pgs).

EPO Communication Pursuant to Article 96(2) EPC, Application No. 05 739 911.5-1243; Ref. HCD/J00049340EP, (6 pgs), Sep. 6, 2007.

Intel; White paper; Easy-attach Storage, making SAN Affordable (8 pgs), 2004.

White Paper; Building Virtual Infrastructure with VMware VirtualCenter; Vitual Infrastructure Software for the Responsive Enterprise; vmare, (10 pgs), 2004.

Computer Associates; Unicenter NSM Dynamic Reconfiguration Option; Complete Management Solution for High-End to Mid-Range Servers (24 pgs), 2003.

Computer Associates; Unicenter NSM Dynamic Reconfiguration Option; Complete Management Solution for High-End to Mid-Range Servers (updated Apr. 22, 2003) (28 pgs).

Computer Associates; Unicenter NSM Dynamic Reconfiguration Option; Getting Started Guide 3.0 (25 pgs), Apr. 2003.

Computer Associates; Unicenter NSM Dynamic Reconfiguration Option; Managing On-Demand Computing (59 pgs), Jun. 26, 2003.

Computer Associates; Unicenter Dynamic Reconfiguration Option; (1 pg), 2003.

Computer Associates; Unicenter NSM Dynamic Reconfiguration Option 3.0; High-End & Midframe Server Discovery, Monitoring & Administration Solution; CA Development Buddy Program (10 pgs), 2003.

Computer Associates; Managing Enterprise Clusters and Dynamic System Domains, Session Code: ENT07SN (47 pgs), 2003.

Managing Dynamic System Domains with Unicenter DRO (22 pgs), 2003.

Computer Associates; Unicenter Advanced Systems Management (UASM) r11 (47 pgs), 2005.

USPTO Office Action for U.S. Appl. No. 11/435,347, filed May 15, 2006; Inventor: Kouros H. Esfahany, Apr. 22, 2008.

Govil, et al., "*Cellular Disco: Resource Management Using Virtual Clusters on Shared-Memory Multiprocessors*", Operating Systems Review, ACM, vol. 33, No. 5, pp. 154-169 (XP000919655), Dec. 5, 2005.

Notification of Transmittal of the International Search Report and the Written Opinion of the International Searching Authority for International Application No. PCT/US2005/014269, filed Apr. 25, 2005 (12 pages), Nov. 16, 2005.

Office Action Summary issued by the USPTO for U.S. Appl. No. 11/114,275, filed Apr. 25, 2005; Inventor: Esfahany, Dec. 4, 2009.

Office Action Summary issued by the USPTO for U.S. Appl. No. 11/255,056, filed Oct. 19, 2005; Inventor: Esfahany, Nov. 27, 2009.

USPTO Office Action Summary for U.S. Appl. No. 11/114,275, filed Apr. 25, 2005; Inventor: Kouros H. Esfahany, May 8, 2009.

USPTO Office Action for U.S. Appl. No. 11/241,155, inventor Michael R. Chiaramonte, mailed Jan. 7, 2010.

USPTO Office Action for U.S. Appl. No. 11/114,275, inventor Kouros H. Esfahany, mailed Mar. 8, 2010.

Advisory Action for U.S. Appl. No. 11/114,275, filed Apr. 25, 2005, Kouros H. Esfahany, mailed Apr. 21, 2010 (2 pgs).

Office Action for U.S. Appl. No. 11/255,056, filed Oct. 19, 2005, Kouros H. Esfahany, mailed Apr. 28, 2010 (16 pg).

U.S. Patent and Trademark Office, Office Action for U.S. Appl. No. 11/241,155, filed Sep. 30, 2005, Kouros H. Esfahany et al., Jul. 23, 2010.

U.S. Patent and Trademark Office, Notice of Allowance for U.S. Appl. No. 11/114,275, filed Apr. 25, 2005, Kouros H. Esfahany et al., Oct. 1, 2010.

* cited by examiner

METHOD AND APPARATUS FOR DYNAMIC MEMORY RESOURCE MANAGEMENT

CROSS-REFERENCE TO RELATED APPLICATION

This application claims the benefit of U.S. provisional application Ser. No. 60/573,578, filed May 21, 2004 and entitled "METHOD AND APPARATUS FOR DYNAMIC MEMORY RESOURCE MANAGEMENT".

TECHNICAL FIELD

The present disclosure relates generally to systems management and more particularly to a method and apparatus for dynamic memory resource management.

DESCRIPTION OF THE RELATED ART

Systems management involves the supervision and management of information technology resources in an enterprise (or other organization). For example, many systems management software include tools for monitoring and collecting information regarding resource usage, such as memory activity.

As enterprises grow, their needs for information technology resources can change rapidly, as demands for performance and reliability tend to increase. The typical approach for addressing the growing demands is to consolidate the servers in order to maximize resources available to a user. For example, applications and infrastructure services running on diverse operating systems can be consolidated on a reduced number of high performance servers, or even a single high performance server, running multiple virtual machines.

A virtual machine is typically a software based concept or logical entity that is implemented over a hardware platform and operating system and can use multiple devices (such as memory, processors, other hardware resources, network systems, etc.) to create multiple virtual systems, each of which can run independently as a copy of the operating system. In other words, a virtual machine can be thought of as a computer that operates inside, for example, a server, as an entity separate from other virtual machines. A virtual machine can allow for flexibility across platforms and can provide performance optimization by allowing time-expensive hardware to be shared.

Virtual machine software, such as VMware ESX Server ("ESX"), can be used to consolidate systems in advanced environments. System(s) as herein referred to may include(s) individual computers, servers, computing resources, and/or networks, etc. For example, ESX can provide a virtualization software tool that deploys multiple, secure isolated virtual machines, with respective allocated memory shares, on a single server system where system resources can be allocated to any virtual machine based on need. However, these system resource allocations can only take place statically or manually, and can prove to be problematic. For example, if a network administrator over-provisions resources based on a worst case scenario, under-utilization of system resources most likely results. On the other hand, under-provisioning of resources can be equally problematic.

It is desirable for users, such as network administrators, to have reliable and effective tools for dynamically managing (in addition to monitoring) system resources based on real time requirements of, for example, virtual machines in virtual environments, in order to meet growing business demands.

SUMMARY

This application describes methods and apparatuses for dynamic memory resource management. A method for dynamic memory resource management, according to an embodiment of the present disclosure, includes collecting memory activity information for a virtual machine, and dynamically changing memory shares (for example, as a proportional resource unit used to determine how much memory the virtual machine should use compared with other running virtual machines). The memory shares of the virtual machine are dynamically changed, as needed, based on the memory activity information for the virtual machine and based on a specified priority of the virtual machine. The method may further include analyzing the collected memory activity information for the virtual machine, to determine memory usage of the virtual machine, and increasing the memory shares of the virtual machine, if it is determined that the memory usage of the virtual machine is equal to or higher than the allocated memory share of the virtual machine. On the other hand, the memory shares of the virtual machine may also be decreased, if it is determined that the memory usage of the virtual machine is substantially lower than the amount currently allocated to the virtual machine, thereby freeing resources for use by other virtual machines.

According to another embodiment, a method for dynamic memory resource management, includes collecting memory related information and user defined criteria for one or more virtual machines, determining the memory state for each of the virtual machines, computing a dynamic priority for each of the virtual machines, and determining whether to increase, decrease, or leave as is memory shares for each of the virtual machines.

An apparatus for dynamic memory resource management, according to one embodiment, includes means for collecting memory activity information for a virtual machine, and means for dynamically changing memory shares of the virtual machine, as needed, based on the memory activity information for the virtual machine and based on a specified priority of the virtual machine.

According to another embodiment, an apparatus for dynamic memory resource management includes means for collecting memory related information and user defined criteria for one or more virtual machines, means for determining the memory state for each of the virtual machines, means for computing a dynamic priority for each of the virtual machines, and means for determining whether to increase, decrease, or leave as is memory shares for each of the virtual machines.

The methods and apparatuses of this disclosure may be embodied in one or more computer programs stored on a computer readable medium or program storage device and/or transmitted via a computer network or other transmission medium. For example, a computer storage medium including computer executable code for dynamic memory resource management, according to one embodiment of the present disclosure, includes code for collecting memory related information and user defined criteria for one or more virtual machines, code for determining the memory state for each of the virtual machines, code for computing a dynamic priority for each of the virtual machines, and code for determining whether to increase, decrease, or leave as is memory shares for each of the virtual machines.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for dynamic memory resource management (also referred to herein as "DMRM"). DMRM according to this disclosure can be utilized to dynamically manage memory utilization and allocation in virtual machines located in virtual environments. Based on certain predefined or specified criteria and priorities, DMRM can continuously adjust and balance the memory utilization across a virtual environment, to meet the resource needs of each virtual machine in the environment, while simultaneously following the user-defined priorities in real time. DMRM may employ dynamic programming techniques and demand-based usage balancing of memory in order to detect possible peak scenarios of memory resource utilizations based on given criteria. The criteria can be established by users (for example, network administrators) and/or dynamically determined as time progresses in order to satisfy real time requirements.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
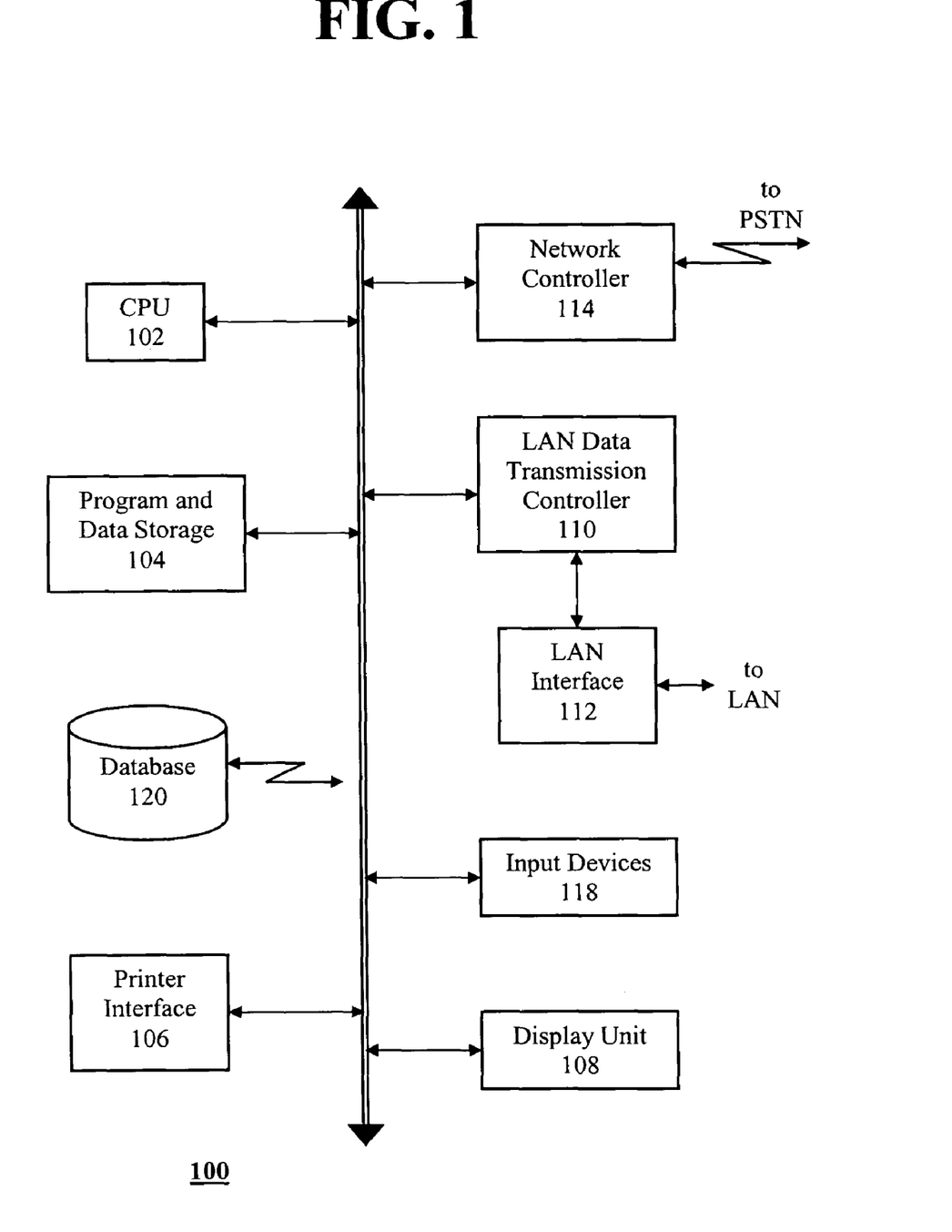
FIG. 1 shows a block diagram of an exemplary computer system capable of implementing the methods and apparatuses of the present disclosure.

FIG. 1 shows an example of a computer system 100 which may implement the methods and apparatuses of the present disclosure. The apparatus and method of the present disclosure may be implemented in the form of a software application running on a computer system, for example, a mainframe, personal computer (PC), handheld computer, server, etc. The software application may be stored on computer readable media or program storage device locally accessible by the computer system, for example, floppy disk, compact disk, hard disk, etc., or may be remote from the computer system and accessible via a hard wired or wireless connection to a computer network (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Methods for dynamic memory resource management are discussed below.

Figure 2A:
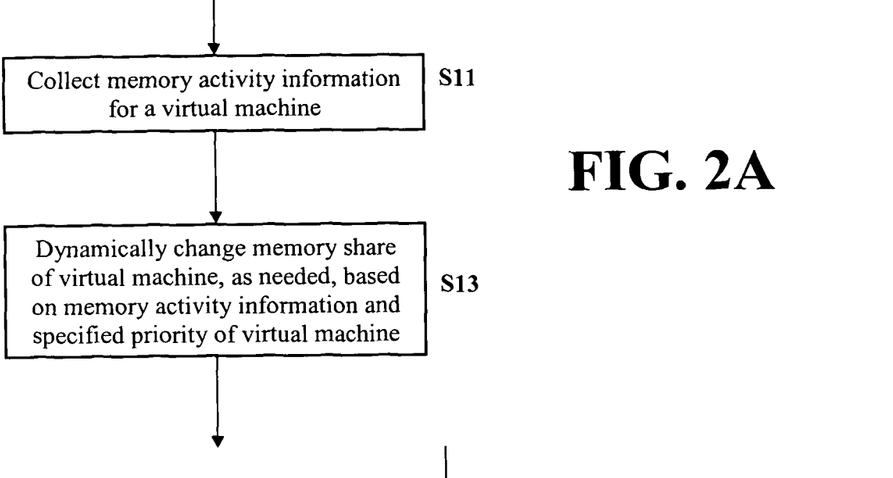
FIG. 2A shows a flow chart illustrating a method for dynamic memory resource management, according to an exemplary embodiment of the present disclosure.

According to an exemplary embodiment (FIG. 2A), a method for dynamic memory resource management includes collecting memory activity information for a virtual machine (step S11), and dynamically changing memory shares of the virtual machine, as needed, based on the memory activity information for the virtual machine and based on a specified priority of the virtual machine (step S12). The method may further comprise analyzing the collected memory activity information for the virtual machine, to determine memory usage of the virtual machine, and then increasing the memory share of the virtual machine if it is determined that the memory usage of the virtual machine is equal to or higher than the allocated memory of the virtual machine, or decreasing the memory share of the virtual machine if it is determined that the memory usage of the virtual machine is substantially lower than the allocated memory of the virtual machine.

Figure 2B:
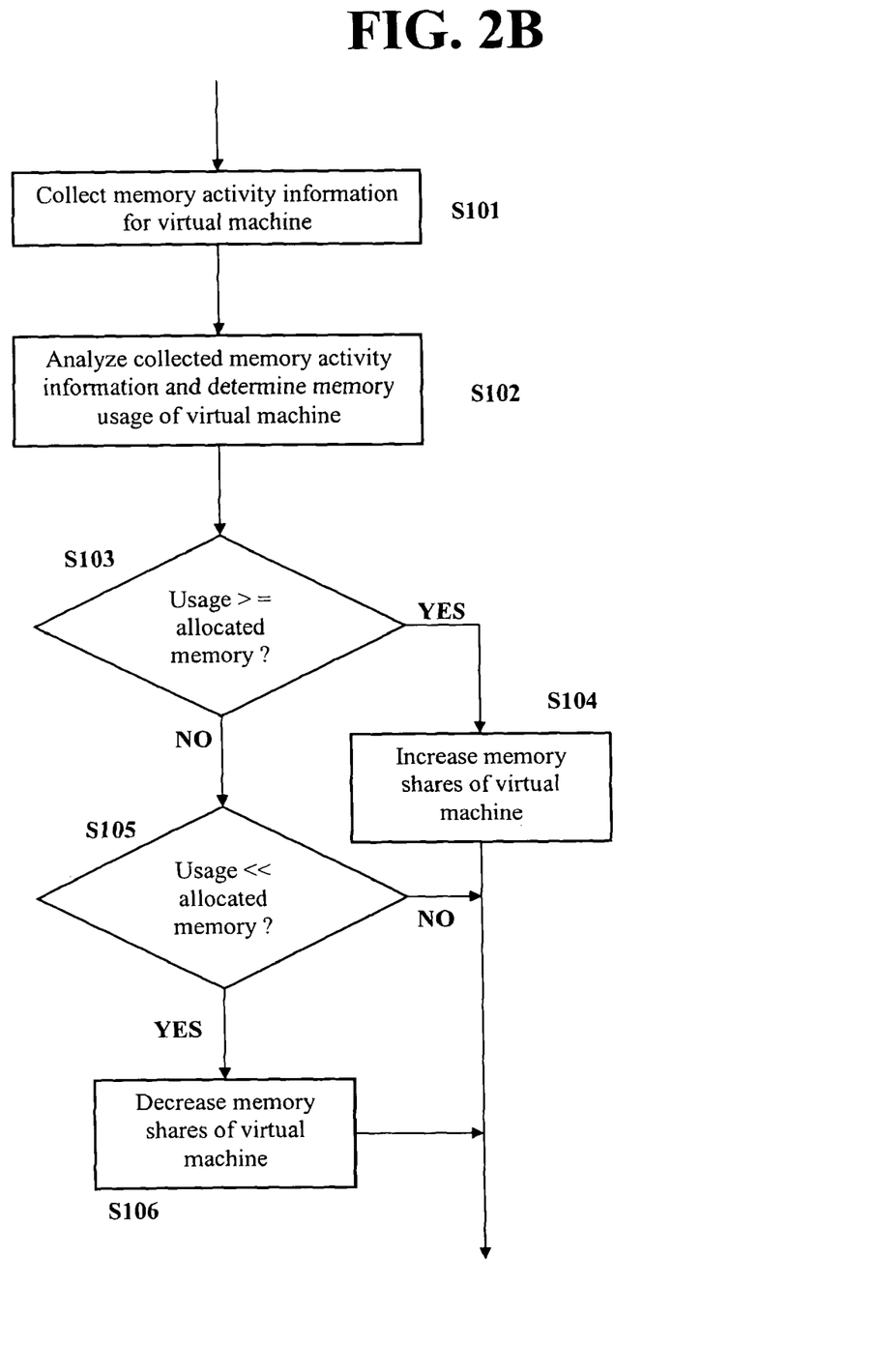
FIG. 2B shows a flow chart illustrating a method for dynamic memory resource management, according to another embodiment.

A method for dynamic memory resource management, according to another exemplary embodiment (FIG. 2B), will be discussed below. Memory activity information is collected for a virtual machine (step S101). Memory shares (for example, proportional amount of memory in comparison to other virtual machines) of the virtual machine are dynamically changed, as needed, based on the memory activity information for the virtual machine and based on a specified priority of the virtual machine. For example, the collected memory activity information for the virtual machine is analyzed to determine memory usage of the virtual machine (step S102). If it is determined that the memory usage of the virtual machine is equal to or higher than the allocated memory of the virtual machine (step S103, "YES"), the memory shares of the virtual machine are increased (step S104). On the other hand, if it is determined that the memory usage of the virtual machine is substantially lower than the allocated memory of the virtual machine (step S103, "NO", and step S105, "YES"), the memory shares of the virtual machine are decreased (step S106).

Figure 2C:
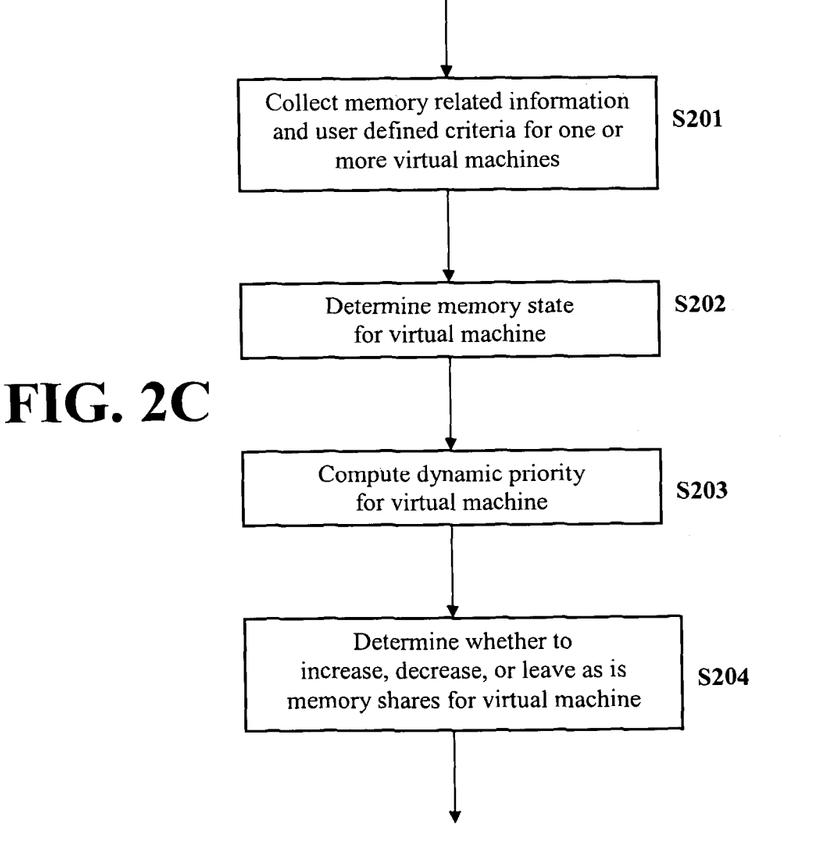
FIG. 2C shows a flow chart illustrating a method for dynamic memory resource management, according to another embodiment.

A method according to another embodiment for dynamic memory resource management is illustrated in FIG. 2C. Memory related information and user defined criteria are collected for one or more virtual machines during an analysis interval (Step S201). The memory state is then determined (Step S202) with respect to the user defined criteria set internal to the engine and a dynamic priority is computed (Step S203), for each virtual machine. An analytical engine makes a determination, based on the memory state, to increase, decrease or leave as is, the memory shares for the virtual machine (Step S204). For example, if the allocated physical memory for a virtual machine is less than what the virtual machine actually needed, used, etc., then the analytical engine can increase the memory shares for that virtual machine. An increase in the memory shares for a virtual machine indicates to the server, to allocate more physical memory for that virtual machine. On the other hand, if the allocated physical memory for a virtual machine is substantially more than what the virtual machine actually needed, used, etc., then the analytical engine can decrease the memory shares for that particular machine. A decrease in the memory share for a particular virtual machine can indicate to the server, to reduce the physical memory allocated for that virtual machine. Based on the determination in Step S204, the memory share for a virtual machine can be updated accordingly. The engine can repeat the entire process in the next analysis interval (Steps S201-S204).

The dynamic priority for a virtual machine can be computed using the user defined criteria. The user defined criteria can comprise one or more management criteria, memory criteria, a virtual machine priority, and a memory coefficient for each of the virtual machines. The user defined criteria can also comprise a poll interval and an analysis interval for each server. The management criteria can comprise information indicating the virtual machines to be managed, not managed or monitored. The memory criteria can comprise information indicating memory needs of the virtual machines to be managed, not managed or monitored. The analysis interval can be the period of time during which the memory related information is collected. The poll interval can be the period of time between collections of memory related information. The memory related information is preferably analyzed in real time.

Figure 3:
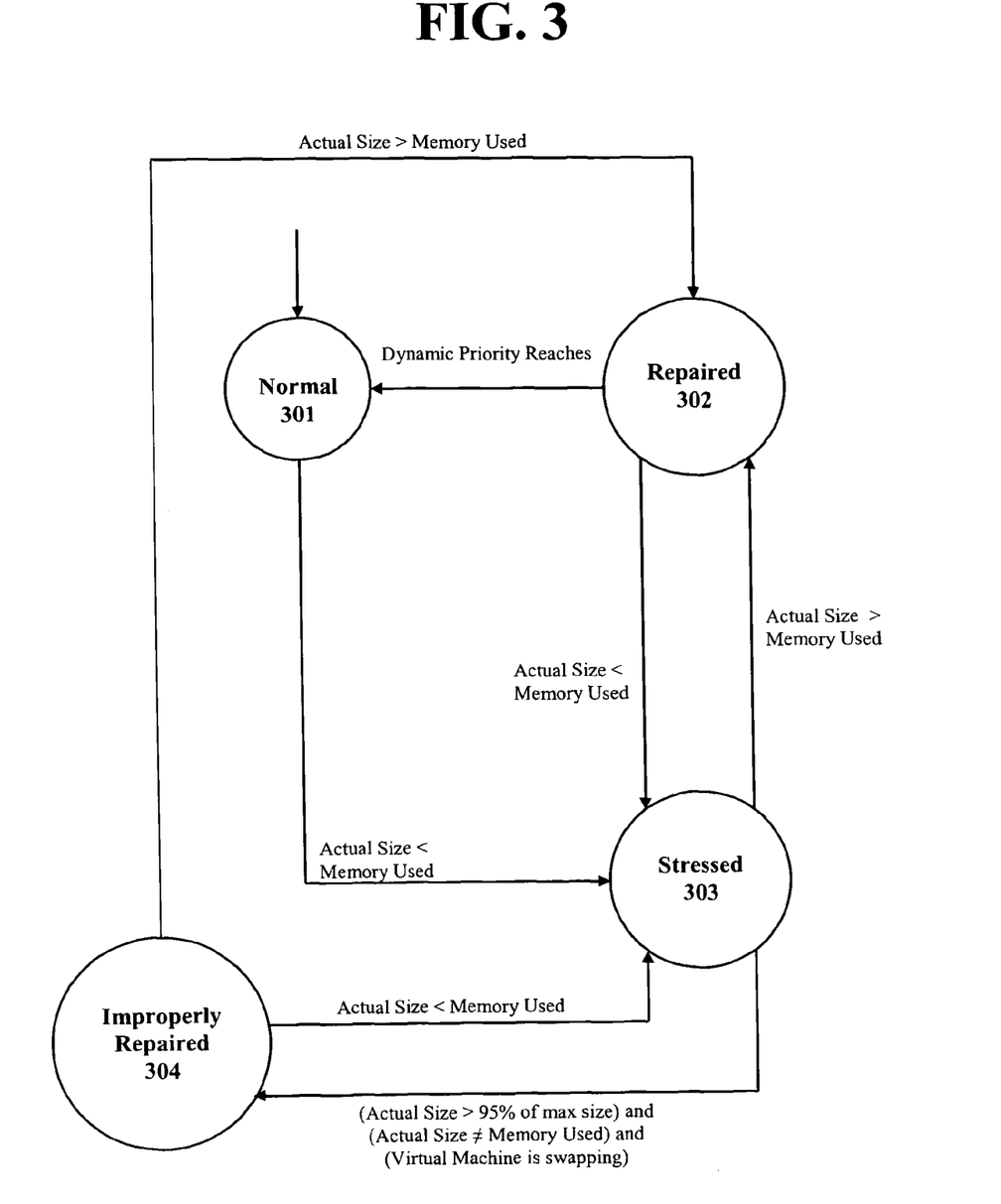
FIG. 3 shows a state transition diagram illustrating the possible memory states for a virtual machine, according to an embodiment of the present disclosure.

FIG. 3 is a schematic diagram illustrating the possible memory states for a virtual machine, according to an embodiment of the present disclosure. The memory states of a virtual machine can include the following: Normal 301, Repaired 302, Stressed 303, and Improperly Repaired 304. A virtual machine starts in a Normal 301 state, and can go from the Normal 301 state to the Stressed 303 state, if the physical size of the allocated memory for the virtual machine is less than the memory used. Similarly, a virtual machine can go from the Repaired 302 state to the Stressed 303 state, if the physical size of the allocated memory is less than the memory used by the virtual machine. A virtual machine can return to the Normal 301 state from the Repaired 302 state, if the dynamic priority reaches a predefined minimum value. A virtual machine can go from the Stressed 303 state to the Improperly Repaired 304 state, if the physical size of the memory allocated to the virtual machine is greater than 95% of the maximum size and is not equal to the memory used. A virtual machine can return from the Stressed 303 state back to the Repaired 302 state, if the actual physical size of the memory is greater than the memory used. A virtual machine can go from the Improperly Repaired 304 state to the Stressed 303 state, if the actual physical size of the memory is less than the memory used or can go to the Repaired 302 state, if the actual physical size of the memory is greater than the memory used.

The virtual machines can reside, according to one exemplary embodiment, in a client-server system with one or more management stations. Memory activity in the system, and in particular for each virtual machine, is monitored, and then can be reported using a reporting tool. The server can be supplemented with additional instrumentation providing the management stations with a comprehensive, real time view of the server and each virtual machine. The management stations can pinpoint status at various levels, such as at the server level or at the virtual machine level. The status of the server and virtual machines can be shown through the reporting tool. Events can be automatically forwarded to event management components, which can further propagate the events to a central management station.

A user, such as a network administrator, can specify whether he/she wants to monitor, manage or not manage memory related information for individual virtual machines. The user can also define a virtual machine priority, and a memory coefficient, for each of the virtual machines located on a server. The user can also define a poll interval and an analysis interval for each server. Memory related information can also be provided, for each of the virtual machines, to allow an analytical engine to dynamically determine memory status of a virtual machine, and whether to allocate additional physical memory to a particular virtual machine.

A front end graphical user interface (for example, implemented in Java) can be provided to configure the user-defined criteria. The parameters entered by the user can be stored in the reporting tool. The analytical engine can then read those stored values from the reporting tool and use them when it is dynamically reconfiguring memory allocations.

An analysis interval may include the period of time, for example, in seconds, during which memory related information can be collected for analysis of virtual machine memory status. A poll interval may include the amount of time, for example, in seconds, between collections of memory related information. The analysis interval preferably is not less than the poll interval. For example, the default value of the analysis interval can be set to twice the amount of the poll interval. If the poll interval is, for example, 60 seconds, the analysis interval can be 120 seconds.

An analytical engine can perform dynamic memory reconfiguration based on memory related information and user-defined criteria. An engine service can also be provided to assist the analytical engine in managing the virtual machines. The engine service can be, for example, a service on a Windows platform or a daemon on a Linux platform, and can spawn the analytical engine responsible for managing a server. For example, the engine service can read the discovered server objects, such as the virtual machines running on the server, and then spawn the analytical engine to take care of dynamic memory reconfiguration.

The specific embodiments described herein are illustrative, and many additional modifications and variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,578, filed May 21, 2004 and entitled "METHOD AND APPARATUS FOR DYNAMIC MEMORY RESOURCE MANAGEMENT", the entire contents of which are incorporated herein by reference.

What is claimed is:

1. A method for dynamic memory resource management, comprising:

collecting memory activity information for a memory allocation of a virtual machine, the memory allocation having a predetermined size;

determining a dynamic priority for the virtual machine based on a specified priority for the virtual machine; and dynamically changing the size of the memory allocation of the virtual machine, as needed, based on the collected memory activity information for the memory allocation of the virtual machine and the determined dynamic priority for the virtual machine, wherein dynamically changing the size of the memory allocation of the virtual machine further comprises:

analyzing the collected memory activity information for a memory allocation of the virtual machine, to determine memory usage of the virtual machine; and performing one or more of the following:

increasing the size of the memory allocation of the virtual machine, if it is determined that the memory usage of the virtual machine is equal to or higher than the allocated memory of the virtual machine; or decreasing the size of the memory allocation of the virtual machine, if it is determined that the memory usage of the virtual machine is substantially lower than the allocated memory of the virtual machine.

2. A computer system comprising:
a processor; and
a program storage device readable by the computer system, tangibly embodying a program of instructions executable by the processor to perform operations comprising:
collecting memory activity information for a memory allocation of a virtual machine, the memory allocation having a predetermined size;
determining a dynamic priority for the virtual machine based on a specified priority for the virtual machine; and
dynamically changing the size of the memory allocation of the virtual machine, as needed, based on the collected memory activity information for the memory allocation of the virtual machine and the determined dynamic priority for the virtual machine, wherein dynamically changing the size of the memory allocation of the virtual machine further comprises:
analyzing the collected memory activity information for a memory allocation of the virtual machine, to determine memory usage of the virtual machine; and
performing one or more of the following:
increasing the size of the memory allocation of the virtual machine, if it is determined that the memory usage of the virtual machine is equal to or higher than the allocated memory of the virtual machine; or
decreasing the size of the memory allocation of the virtual machine, if it is determined that the memory usage of the virtual machine is substantially lower than the allocated memory of the virtual machine.

3. A program storage device readable by a machine, tangibly embodying a program of instructions operable when executed to:
collect memory activity information for a memory allocation of a virtual machine, the memory allocation having a predetermined size;
determine a dynamic priority for the virtual machine based on a specified priority for the virtual machine; and
dynamically change the size of the memory allocation of the virtual machine, as needed, based on the collected memory activity information for the memory allocation of the virtual machine and the determined dynamic priority for the virtual machine, wherein dynamically changing the size of the memory allocation of the virtual machine further comprises:
analyzing the collected memory activity information for a memory allocation of the virtual machine, to determine memory usage of the virtual machine; and
performing one or more of the following:
increasing the size of the memory allocation of the virtual machine, if it is determined that the memory usage of the virtual machine is equal to or higher than the allocated memory of the virtual machine; or
decreasing the size of the memory allocation of the virtual machine, if it is determined that the memory usage of the virtual machine is substantially lower than the allocated memory of the virtual machine.

4. An apparatus for dynamic memory resource management, comprising:
means for collecting memory activity information for a memory allocation of a virtual machine, the memory allocation having a predetermined size;
means for determining a dynamic priority for the virtual machine based on a specified priority for the virtual machine; and
means for dynamically changing the size of the memory allocation of the virtual machine, as needed, based on the memory activity information for the memory allocation of the virtual machine and based on a specified priority of the virtual machine, wherein dynamically changing the size of the memory allocation of the virtual machine further comprises:
analyzing the collected memory activity information for a memory allocation of the virtual machine, to determine memory usage of the virtual machine; and
performing one or more of the following:
increasing the size of the memory allocation of the virtual machine, if it is determined that the memory usage of the virtual machine is equal to or higher than the allocated memory of the virtual machine; or
decreasing the size of the memory allocation of the virtual machine, if it is determined that the memory usage of the virtual machine is substantially lower than the allocated memory of the virtual machine.

5. A method for dynamic memory resource management, comprising:
using a computer system, collecting memory related information for a memory allocation for one or more virtual machines, the memory allocation having a predetermined size;
using the computer system, collecting user defined criteria for each of the one or more virtual machines;
using the computer system, determining a memory state for each of the one or more virtual machines;
using the computer system, computing a dynamic priority for each of the one or more virtual machines based on the user defined criteria; and
using the computer system, determining, based on the memory related information for the memory allocation, the memory state, and the computed dynamic priority for each of the one or more virtual machines, whether to increase, decrease, or maintain the allocated memory of each of the one or more virtual machines, wherein determining whether to increase, decrease, or maintain the allocated memory of each of the one or more virtual machines further comprises:
increasing the size of the memory allocation of the virtual machine if it is determined that actual memory usage of the virtual machine is higher than an allocated physical memory of the virtual machine; or
decreasing the size of the memory allocation of the virtual machine is decreased if it is determined that actual memory usage of the virtual machine is lower than an allocated physical memory of the virtual machine.

6. The method of claim 5, further comprising analyzing the memory related information in real time.

7. The method of claim 5, wherein the user defined criteria comprises one or more management criteria, memory criteria, a virtual machine priority, and a memory coefficient, for each of the virtual machines.

8. The method of claim 7, wherein the management criteria comprises information indicating the virtual machines to be managed, not managed or monitored.

9. The method of claim 7, wherein the memory criteria comprises information indicating memory needs of the virtual machines to be managed, not managed or monitored.

10. The method of claim 5, wherein the user defined criteria comprises a poll interval and an analysis interval, for each server.

11. The method of claim 10, wherein the analysis interval is the period of time during which the memory related information is collected.

12. The method of claim 10, wherein the poll interval is the period of time between collections of memory related information.

13. The method of claim 5, wherein the memory state is either normal, stressed, repaired or improperly repaired.

14. The method of claim 5, wherein the dynamic priority for each of the virtual machines is computed using the user defined criteria.

15. The method of claim 5, wherein the virtual machines are located in a client-server system.

16. A computer system comprising:
a processor; and
a program storage device readable by the computer system, tangibly embodying a program of instructions executable by the processor to perform operations comprising:
collecting memory related information for a memory allocation for one or more virtual machines, the memory allocation having a predetermined size;
collecting user defined criteria for each of the one or more virtual machines;
determining a memory state for each of the one or more virtual machines;
computing a dynamic priority for each of the one or more virtual machines based on the user defined criteria; and
determining, based on the memory related information for the memory allocation, the memory state, and the computed dynamic priority for each of the one or more virtual machines, whether to increase, decrease, or maintain the allocated memory of each of the one or more virtual machines, wherein determining whether to increase, decrease, or maintain the allocated memory of each of the one or more virtual machines further comprises:
increasing the size of the memory allocation of the virtual machine if it is determined that actual memory usage of the virtual machine is higher than an allocated physical memory of the virtual machine; or
decreasing the size of the memory allocation of the virtual machine is decreased if it is determined that actual memory usage of the virtual machine is lower than an allocated physical memory of the virtual machine.

17. A program storage device readable by a machine, tangibly embodying a program of instructions operable when executed to:
collect memory related information for a memory allocation for one or more virtual machines, the memory allocation having a predetermined size;
collect user defined criteria for each of the one or more virtual machines;
determine a memory state for each of the one or more virtual machines;
compute a dynamic priority for each of the one or more virtual machines based on the user defined criteria; and
determine, based on the memory related information for the memory allocation, the memory state, and the computed dynamic priority for each of the one or more virtual machines, whether to increase, decrease, or maintain the allocated memory of each of the one or more virtual machines, wherein determining whether to increase, decrease, or maintain the allocated memory of each of the one or more virtual machines further comprises:
increasing the size of the memory allocation of the virtual machine if it is determined that actual memory usage of the virtual machine is higher than an allocated physical memory of the virtual machine; or
decreasing the size of the memory allocation of the virtual machine is decreased if it is determined that actual memory usage of the virtual machine is lower than an allocated physical memory of the virtual machine.

18. An apparatus for dynamic memory resource management, comprising:
means for collecting memory related information for a memory allocation for one or more virtual machines, the memory allocation having a predetermined size;
means for collecting user defined criteria for each of the one or more virtual machines;
means for determining a memory state for each of the one or more virtual machines;
means for computing a dynamic priority for each of the one or more virtual machines based on the user defined criteria; and
means for determining, based on the memory related information for the memory allocation, the memory state, and the computed dynamic priority for each of the one or more virtual machines, whether to increase, decrease, or maintain the allocated memory of each of the one or more virtual machines, wherein determining whether to increase, decrease, or maintain the allocated memory of each of the one or more virtual machines further comprises:
increasing the size of the memory allocation of the virtual machine if it is determined that actual memory usage of the virtual machine is higher than an allocated physical memory of the virtual machine; or
decreasing the size of the memory allocation of the virtual machine is decreased if it is determined that actual memory usage of the virtual machine is lower than an allocated physical memory of the virtual machine.

* * * * *